June 2, 1925.                T. KEENAN                1,540,478
PISTON
Filed Sept. 3, 1924
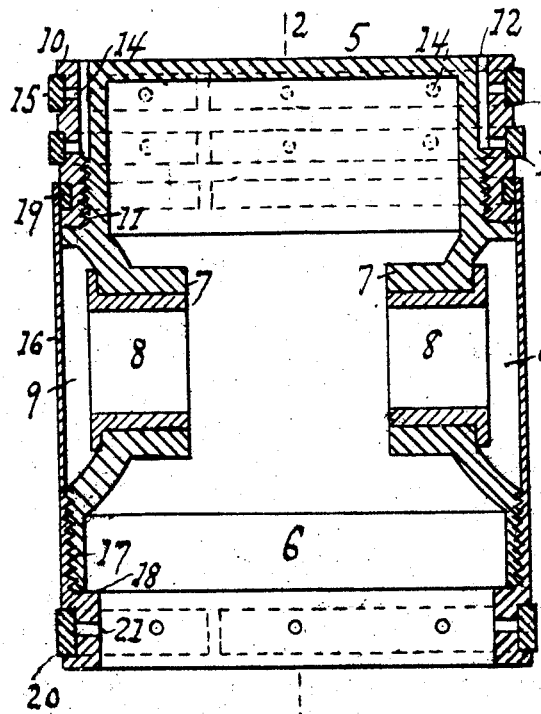
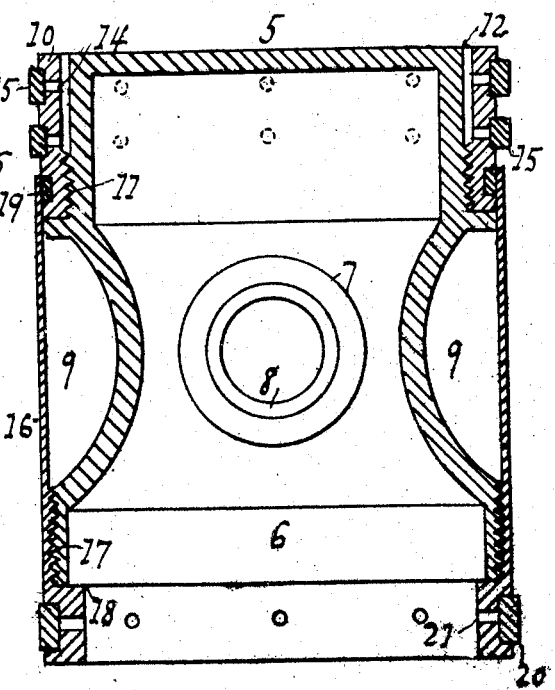
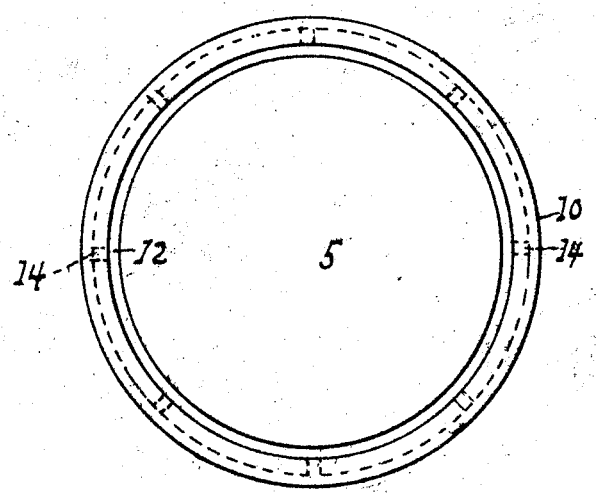
INVENTOR
Thomas Keenan
BY
ATTORNEYS Patented June 2, 1925.

1,540,478

UNITED STATES PATENT OFFICE.

THOMAS KEENAN, OF BROOKLYN, NEW YORK.

PISTON.

Application filed September 3, 1924. Serial No. 735,561.

*To all whom it may concern:*

Be it known that I, THOMAS KEENAN, a citizen of the United States, residing at Brooklyn, in the county of Kings and State of New York, have invented new and useful Improvements in Pistons, of which the following is a specification.

This invention relates to a piston which is preferably adapted for internal combustion engines but could be used with any other type of engine.

An object of the invention is to provide a head with a depending skirt having an air space adjacent the head for permitting air from above to force the packing ring outward.

Another object of the invention is to provide a resilient sleeve attached to the lower part of the skirt so that the portion above the attached part is free to assume the shape of the bore of a cylinder in which the piston slides.

Another object of the invention is to provide a packing ring inside of the sleeve at its top end so as to prevent leakage of oil from above to the interior of the sleeve.

Another object of the invention is to provide means for carrying the packing rings arranged at the upper portion of the skirt and spaced therefrom to permit expansion or contraction of the head.

Another object of the invention is to provide the lower end of the sleeve with a packing ring and a series of orifices whereby air compressed by the descent of the piston will expand the packing to align the piston in the bore.

The invention resides more particularly in the novel combinations hereinafter described and claimed reference being made to the accompanying drawing in which:—

Fig. 1 represents a vertical section of a piston embodying this invention.

Fig. 2 is a similar section taken along the line 2—2 of the same.

Fig. 3 is a plan view thereof.

In the drawing the numeral 5 designates a head having a depending skirt 6 cast of duraluminum to make it as light as possible. The skirt has hubs 7 with brass bushings 8 one being opposite the other to provide bearings for a wrist pin not shown, on which a connecting rod is mounted as is well-known. A portion of the skirt is concave to form an air space 9 between the outer wall of a skirt and the cylinder.

An annular member 10 is screwed at 11 to the upper portion of the skirt. The part above the thread of the member is recessed or milled to form an annular channel 12 about the head which communicates with a series of holes 14 laterally located in the annular member. Split packing rings 15 are arranged in grooves in the face of the member and the air sucked into the channel by the movement of the piston expands the packing rings or forces them outward to align the skirt against the bore of the cylinder.

In order to align the major portion of the skirt and to provide a durable contact surface with the bore of the cylinder a brass sleeve 16 is provided. The sleeve is screwed at 17 to the skirt and a shoulder 18 butts against the bottom of the skirt to limit the upward adjustment of the sleeve. The portion of the sleeve above the thread sets loosely about the skirt and a split packing ring 19 carried by the annular member presses against the interior of the sleeve to prevent any fluid from entering the space between the skirt and sleeve. The lower end of the sleeve carries a packing ring 20 and orifices 21 in the skirt permit the air from below to expand the packing in order to give a tight joint with the bore of the cylinder. The method of attaching the resilient sleeve to the skirt permits the portion above the thread to shape itself to an irregular cylinder bore and it also permits expansion or contraction of the sleeve without danger of fracture or breakage.

I claim:—

1. A piston having a head with a depending skirt, an annular member connected to the skirt, packing rings carried by the member, and means arranged between the member and skirt for admitting air to the back of the packing rings.

2. A piston having a head with a depending skirt, an annular member screwed to the upper portion of the skirt, packing rings carried by the member, said member being made to form a channel adjacent the head to conduct air from above to the backs of the packing rings.

3. A piston having a head with a depending skirt, an annular member having a series of holes screwed to the upper portion of the skirt, packing rings carried by the member, said member being made to form a channel adjacent the head to conduct air from above through the holes to the backs of the packing rings.

4. A piston having a head with a depending skirt, an annular member screwed to the upper portion of the skirt, a packing ring carried by the member, and a sleeve attached to the lower portion of the skirt the upper end of which sets over the packing to prevent leakage between the skirt and sleeve.

5. A piston having a head with a depending skirt, an annular member screwed to the upper portion of the skirt, a packing ring carried by the member, a sleeve attached to the lower portion of the skirt the upper end of which sets over the packing to prevent leakage between the skirt and sleeve, and a packing ring arranged at the lower end of the sleeve.

6. A piston having a head with a depending skirt, an annular member screwed to the upper portion of the skirt, a packing ring carried by the member, a sleeve attached to the lower portion of the skirt the upper end of which sets over the packing to prevent leakage between the skirt and sleeve, a packing ring arranged at the lower end of the sleeve, and means for conducting air from below to press the packing outward.

In testimony whereof I have hereunto set my hand.

THOMAS KEENAN.